United States Patent [19]

Honjo et al.

[11] Patent Number: 4,542,416
[45] Date of Patent: Sep. 17, 1985

[54] SYSTEM FOR ELIMINATING VERTICAL TV PICTURE FLUCTUATIONS APPEARING IN MONITORED VIDEO SIGNALS FROM A VTR

[75] Inventors: Masahiro Honjo; Masao Tomita, both of Neyagawa, Japan

[73] Assignee: Matsushita Electric Industrial Co., Ltd., Osaka, Japan

[21] Appl. No.: 528,664

[22] Filed: Sep. 1, 1983

Related U.S. Application Data

[63] Continuation-in-part of Ser. No. 252,015, Apr. 8, 1981, abandoned.

[30] Foreign Application Priority Data

Apr. 11, 1980 [JP] Japan ................................. 55-48361

[51] Int. Cl.⁴ ............................................. H04N 5/783
[52] U.S. Cl. .................................................. 360/10.3
[58] Field of Search ................... 360/10.1, 10.2, 10.3, 360/11.1, 36.1, 36.2, 37.1; 358/312, 314, 325, 327, 337, 339, 310

[56] References Cited

U.S. PATENT DOCUMENTS

| 4,139,867 | 2/1979 | Foerster | 360/10 |
| 4,216,504 | 8/1980 | Boussina et al. | 360/10 X |
| 4,251,830 | 2/1981 | Tatami | 360/10 X |
| 4,268,875 | 5/1981 | Morio et al. | 360/10 |
| 4,280,133 | 7/1981 | Kato | 360/10 X |
| 4,283,737 | 8/1981 | Nikami | 360/10.3 |
| 4,283,744 | 8/1981 | Melwisch et al. | 360/10 |
| 4,405,955 | 9/1983 | Kaimai et al. | 360/10.3 |
| 4,456,932 | 6/1984 | Honjo et al. | 360/36.1 |

FOREIGN PATENT DOCUMENTS 2077551 12/1981 United Kingdom ................. 360/10

*Primary Examiner*—Donald McElheny, Jr.
*Attorney, Agent, or Firm*—Wenderoth, Lind & Ponack

[57] ABSTRACT

In a rotary head magnetic recording and reproducing system, the number of horizontal synchronous signals which occur between the vertical synchronous signals are kept almost constant by delaying the video signal of the field following the one in which a shift of a track has been detected, the operation occurring when the system is in the abnormal reproducing mode in which the speed of the magnetic tape in the reproducing mode is different from the speed of the magnetic tape in the previous recording mode.

3 Claims, 10 Drawing Figures

| a | FIELD NUMBER | F1 | F2 | F3 | F4 | F5 | F6 | F7 | F8 | F9 |
|---|---|---|---|---|---|---|---|---|---|---|
| b | SCANNING TRACK | A1 | A1 | A1 | A1 | A2 | A2 | A2 | A2 | A3 |
| c | H NUMBER | 264 | 264 | 264 | 261 | 264 | 264 | 264 | 261 | 264 |
| d | DELAY TIME | 0 | 0 | 0 | 0 | 2 | 1 | 0 | 0 | 2 |
| e | CORRECTED H | 264 | 264 | 264 | 263 | 263 | 263 | 264 | 263 | |

| a | FIELD NUMBER | F1 | F2 | F3 | F4 | F5 | F6 | F7 | F8 | F9 |
|---|---|---|---|---|---|---|---|---|---|---|
| b | SCANNING TRACK | A1 | A1 | A2 | A3 | A3 | A4 | A5 | A5 | A6 |
| c | H NUMBER | 264 | 261 | 261 | 264 | 261 | 261 | 264 | 261 | 261 |
| d | DELAY TIME | 2 | 1 | 2 | 2 | 1 | 2 | 2 | 1 | 2 |
| e | CORRECTED H | 263 | 262 | 261 | 263 | 262 | 261 | 263 | 262 | |
| f | DELAY TIME | 2 | 0 | 1 | 2 | 0 | 1 | 2 | 0 | 1 |
| g | CORRECTED H | 262 | 262 | 262 | 262 | 262 | 262 | 262 | 262 | |

SYSTEM FOR ELIMINATING VERTICAL TV PICTURE FLUCTUATIONS APPEARING IN MONITORED VIDEO SIGNALS FROM A VTR

This application is a continuation-in-part of now abandoned application Ser. No. 252,015, filed Apr. 8, 1981.

BACKGROUND OF THE INVENTION

This invention relates to a method of processing video signals for eliminating vertical picture fluctuations that appear in monitoring video signals (by a television receiver) which are reproduced from a video tape recorder in an abnormal mode in which the speed of the tape in the reproducing mode is different from the speed of the tape in the previous recording mode, so as to obtain stable picture reproduction.

BRIEF SUMMARY OF THE INVENTION

Therefore, an object of this invention is to prevent vertical fluctuations on a television screen by delaying the video signal which has fluctuating vertical synchronous signal cycle periods for a predetermined time during each field.

Another object of this invention is to achieve said correction in an abnormal reproducing mode in which the speed of the tape in the reproduction mode is different from its speed in the previous recording mode or in the mode in which the speed of the tape changes continuously.

BRIEF DESCRIPTION OF THE DRAWINGS

These and other objects of the invention will be apparent from a consideration of the following detailed description with reference to the accompanying drawings, in which.

DESCRIPTION OF THE PRIOR ART

Figures 1, 2, 3:
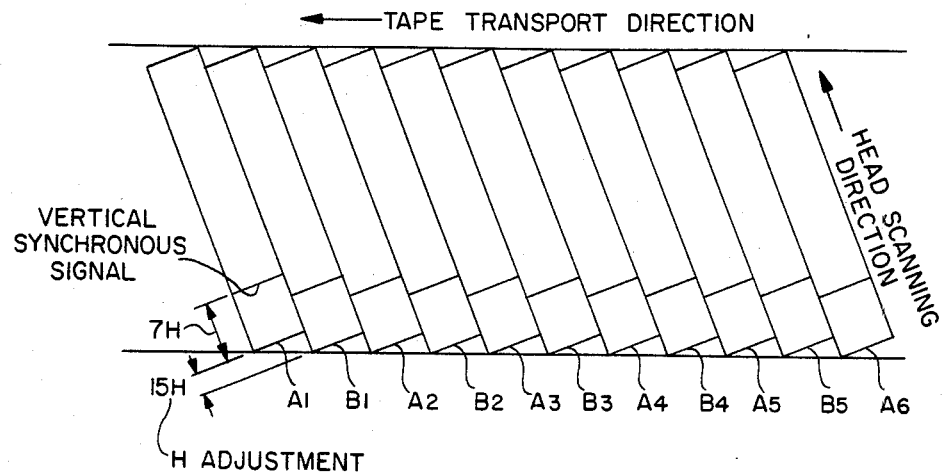
FIG. 1 is a recording pattern on the magnetic tape which is recorded by the magnetic heads in a VTR.
FIG. 2 is a correction of the ½ slow motion mode.
FIG. 3 is a correction of the 4/3 fast motion mode.

In a rotary head magnetic recording and reproducing system (hereinafter referred to as a VTR), the slopes of the traces of the scanning rotary heads upon reproduction are different from the slopes of the tracks which have been scanningly recorded by the rotary heads, when the reproduction is a slow motion reproduction, a still picture reproduction or quick motion reproduction which is performed at a tape transportation speed which is different from that which was previously used during recording. For example, in a VTR wherein the tape scanning direction of the rotary head is the same as that of the tape transportation, the slopes of the scanning traces of the rotary heads are not steep for slow motion reproduction and still picture reproduction, and are less steep than the recorded tracks. On the contrary, the slopes of the scanning traces for quick reproduction are steep, and are steeper than the recorded tracks. Therefore, in reproduction in these cases, the heads scan plural recorded tracks in one field. Accordingly, not only are noise bands produced, but the number of horizontal synchronous signals (H number) reproduced in each field becomes different from the H number used in recording. For example, in the case of still picture reproduction by a VTR for azimuth recording which performs a 1.5H H number adjustment, 264H are reproduced in a field. (Usually this should be 262.5H).

In a VTR for azimuth recording, output signals cannot be obtained upon reproduction unless the heads used in recording are identical to those used upon reproduction. Accordingly, since the H number upon reproduction is different from that upon recording as mentioned above, the time periods between adjacent vertical synchronous signals in the reproduced video signals become different from those in the recorded video signals. In the above-mentioned example, a time difference of 3H occurs between the adjacent fields. That is, the vertical synchronous signals cycle by 262.5H, 265.5H, 265.5H, ..., namely by alternating long and short fields. During the slow motion reproduction, a similar non-constant vertical synchronous signal cycle period also occurs. But in this case, such long and short fields do not cycle by adjacent fields as was the case in still picture reproduction. For example, in a 1/5 slow motion reproduction, 5 fields form one cycle.

The foregoing description is directed to the case when each rotary head scans plural recorded tracks in each scanning period upon reproduction. However, the above described non-constant vertical synchronous signal cycle period occurs quite similarly when the VTR employs an electrical-to-mechanical conversion element for moving each rotary head in a direction which is perpendicular to the scanning direction so as to perform complete on-tracking, because even in such a case, the H number reproduced in each head scanning period is different from that recorded therein.

For example, in the case of the still reproduced mode by said VTR which employs an electrical-to-mechanical conversion element, which is used for azimuth recording and which performs an H number adjustment by 1.5H, it reproduces 264H in one field.

For another example, in the case of the slow reproduction mode by said VTR, which is used for azimuth recording and which performs an H number adjustment by 1.5H, it reproduces either 264H or 261H for each field.

If a composite video signal having such a non-constant vertical synchronous signal cycle period is applied to a television receiver, when the azimuth recording performs an H number adjustment by 1.5H, the reproduced picture frames appear shifted vertically on the television screen, which is the so called vertical picture fluctuations (hereinafter referred to as V-fluctuations), causing extremely poor pictures.

Heretofore, as an example of a method for the elimination of said V-fluctuations, there has been a correction method which delays the vertical synchronous signals of the video signal; however, this correction requires an adjustment on each television which is very troublesome for users.

DETAILED DESCRIPTION OF THE PREFERRED EMBODIMENT

Referring to FIG. 1, there is shown a recording pattern on the tape which is recorded by the magnetic heads of a VTR including: recorded tracks $A_1$, $B_1$, $A_2$, $B_2$, $A_3$, ..., the scanning direction of the magnetic heads, the direction of the tape transportation, the vertical synchronous signal, and the form of the H number's adjustment (1.5H in this case), wherein recorded tracks $A_1$, $A_2$, $A_3$ ... are recorded by the magnetic head A with an azimuth A and recorded tracks $B_1$, $B_2$, $B_3$ ... are recorded by the magnetic head B with an azimuth B, and wherein azimuth A is usually different from azimuth B.

From here on, we give a detailed description of a VTR performing a H number adjustment of 1.5H. As an example, we detail the case of a VTR which employs an electrical-to-mechanical conversion element for moving each rotary head perpendicular to the scanning direction so as to perform complete on-tracking (and each head has the same azimuth).

FIG. 2 shows correction of the ½ slow motion mode; line (a) is the field number; line (b) is the track scanned by the magnetic heads; line (c) is the H number in a field; line (d) is the delay time for correction and line (e) is the corrected H number in a field. The heads only scan, for example, track A in the field reproductive mode, and in the ½ slow motion mode, they scan 4 times on each track, e.g.—$A_1$, $A_1$, $A_1$, $A_1$, $A_2$, $A_2$, $A_2$, $A_2$, $A_3$, $A_3$, ..., as shown in line (b) of FIG. 2. Although the H number is 264H when the heads scan the same track, and when the heads shift tracks, e.g.—$A_1 \rightarrow A_2$ or $A_2 \rightarrow A_3$, the H number of the preceding field becomes 261H. As a result, the H number changes 3H suddenly when the heads shift tracks (264H→261H) so that V-fluctuation occurs. As shown in line (d) of FIG. 2, the video signal of field number F5 is delayed 2H, and the video signal of the next field F6 is delayed 1H. Here, the H number in a field is corrected to 263H as shown in line (e) of FIG. 2.

Generally speaking, when video signal delay of the following field is 2H, and delay of the video signal of the next field is 1H, and no delay occurs anytime after that, the difference of the H number in each field is reduced so as to be within 1H, and this reduces the V-fluctuation. Thus, there is a correction which delays the video signal for 2H, 1H, 0, in order of the fields. This correction is the first correction.

Similarly, FIG. 3 shows the correction in the 4/3 fast motion mode. In this case, two heads scan the track, e.g.—$A_1$, $A_1$, $A_2$, $A_3$, $A_3$, $A_4$ .... However, the H number corrected by the first correction is not correct as shown in line (e) of FIG. 3. Line (d) of FIG. 3 shows the delay time with respect to the first correction. When using a corre-tion which usually delays the video signal for 2H and does not delay the video signal of the following field (where the magnetic heads do not shift tracks), and delays the video signal fo the next field for 1H, and then delays for 2H after that as shown in line (f) of FIG. 3, then the difference of the H number in each field is eliminated as shown in line (g) of FIG. 3 and the corrected H number is 262H in all fields. This correction is the second correction. In the above mentioned description, two corrections were detailed at two fixed speeds of the tape, ½ slow motion mode and 4/3 fast motion mode.

Figure 4:
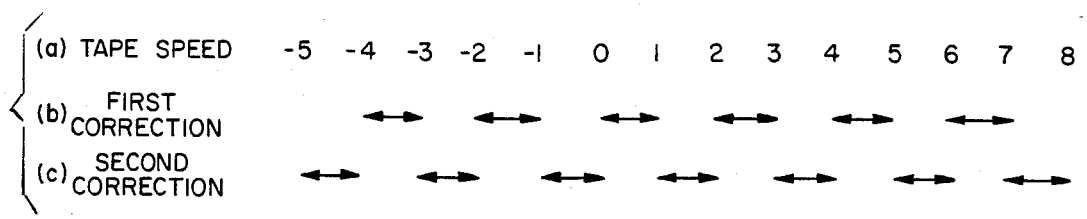
FIG. 4 is the relationship between the correction and the reproduction speed of the tape.

These types of corrections can be developed for any speed mode, that is, by adjusting the correction to match the tape speed, we can correct the video signal for any tape speed. FIG. 4 shows the relationship between the correction and the reproduction speed of the tape. For example, in the X-4 to X-3 speed mode of the tape, this system uses the first correction, and in the X1 to X2 speed mode of the tape, it uses the second correction. The field where correction is started is the following field which is detected by the track shift detector. A track shift detector detects the number of control signals in one field (which is either an odd number or an even number including zero). For example, in the X-1 to X1 speed mode of the tape, the number of control signals is usually zero in a field and in X3 to X5 speed of the tape, the number of control signals is usually two in a field. So the track shift detector detects fields which have an odd number of control signals in a field. The other way, for example, in the X-3 to X-1 speed mode of the tape or in the X1 to X3 speed mode of the tape, the track shift detector detects fields which have an even or zero number of control signals in a field because the number of control signals in a field is usually an odd number.

In summarizing, this invention at first detects the speed of the tape by a velocity detector, and chooses the correction corresponding to that speed of the tape, and detects the field where correction is to start by a track shift detector, and delays the video signal in each field for a predetermined time. In this way, this system is able to correct any tape speed.

Figure 5:
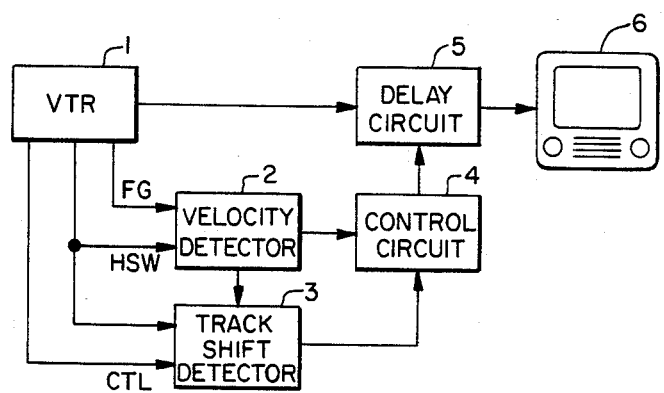
FIG. 5 is a schematic block diagram of this invention.

FIG. 5 shows a schematic block diagram of this invention, wherein the reproducted video signal by the VTR 1 is supplied to the delay circuit 5, and an output of the delay circuit 5 is supplied to the television 6. The signals picked up from the VTR 1 are not only the video signal but also a head switch signal (HSW), a control signal (CTL) and an output signal from the frequency generator which generates signals in proportion to the speed of the tape (FG). The HSW signal is a rectangular wave signal of about 30 Hz, which alternatingly inverts its level every field period in which the magnetic head scans one track. The CTL signal is recorded on a control track (not shown) of the magnetic tape with a predetermined relationship with respect to each of the video tracks. Usually the CTL signal is a series of control pulses recorded at the rate of one pulse per two fields. The FG signal is generated by the frequency generator by detecting the rotation of a capstan motor for driving the magnetic tape. As is well known to those skilled in the art, these signals—HSW, CTL and FG—are fundamental signals for operating the VTR, and accordingly, easily obtained from the VTR. Then both signals FG and HSW are supplied to a velocity detector 2, and both signals HSW and CTL are supplied to the track shift detector 3. An output of the velocity detector 2 is supplied to the track shift detector 3 and the control circuit 4, and an output of the track shift detector 3 is supplied to the control circuit 4, and the control circuit 4 controls the delay circuit 5.

The delay circuit 5 is the circuit which delays the reproduced video signal for a predetermined time on each field, wherewith the reproduced video signal which is an output of the delayed circuit 5 is corrected so that the H number in a field is almost constant. Thus, the reproduced picture appears stable on the television screen 6.

The control circuit 4 which is connected to the velocity detector 2 and the track shift detector 3 controls the delay circuit 5 so as to choose one of two corrections at any given time, i.e.—the first correction or the second correction. Here, the first correction delays video signals for the maximal time, and controls the time of delay so that it decreases step by step in each field, for example 2H, 1H, 0H. The second correction delays video signals for the minimal time, and controls the time of delay so that it increases step by step in each field, for example 0H, 1H, 2H. The velocity detector 2 the speed of the tape by the counting of FG pulses for a fixed period, for example, one field period, wherein it comprises a comparator and a counter and gates.

The track shift detector 3 detects the shift of the track which the heads scan, wherein its input signals are the signals HSW and CTL from the VTR 1, and the track shift detector 3 detects the number of CTL pulses in a field, said number being either an odd or an even number or zero; then, by said detection and the signal from the velocity detector 2, the detector 3 generates a signal at the top of the field in which correction is to start, and supplies said signal to the control circuit 4.

Figure 6:
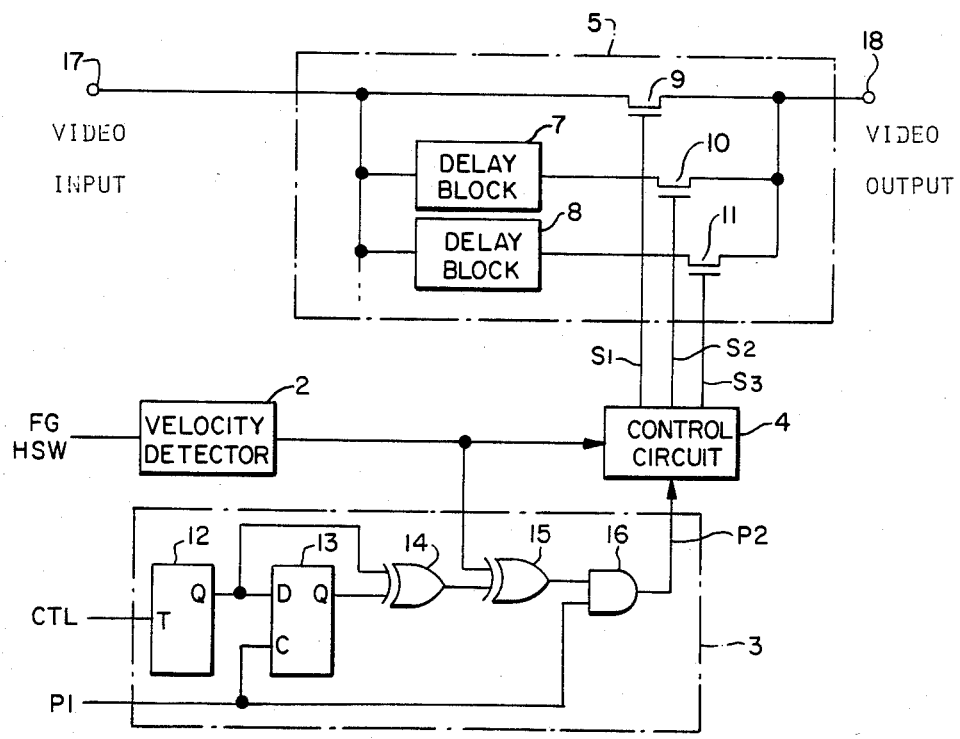
FIG. 6 is a concrete block diagram of this invention.

Referring to FIG. 6, there is shown a concrete block diagram of this invention, wherein an input terminal 17 is connected to the VTR 1, and an output terminal 18 is connected to the television 6. The delay circuit 5 which is surrounded with a dotted line comprises: a 1H delay block 7 which delays the video signal for 1H, a 2H delay block 8 which delays the signal for 2H, an analog switch 9 which connects the input signal to the output terminal 18, an analog switch 10 which connects a 1H delayed signal to the output terminal 18 and an analog switch 11 which connects a 2H delayed signal to the output terminal 18. Analog switches 9, 10, and 11 are supplied with signals $S_1$, $S_2$, and $S_3$ which are controlled by the control circuit 4 for each field. The track shift detector 3 which is surrounded by a dotted line comprises T-flip-flop (T-FF) 12, D-flip-flop (D-FF) 13, Ex-OR gate 14, 15, AND gate 16 and an HSW edge detector 19 which detects the pulse edges (i.e.—the rising and falling edges) of the HSW signal.

Figure 7:
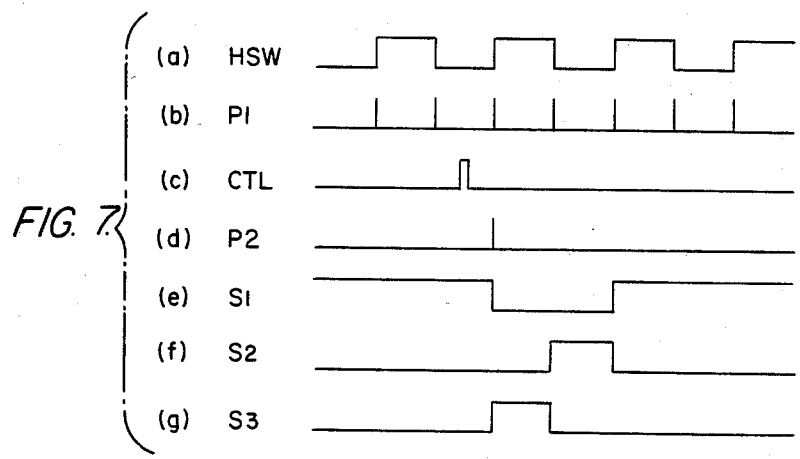
FIG. 7 is a time chart in a slow motion mode.
Figure 8:
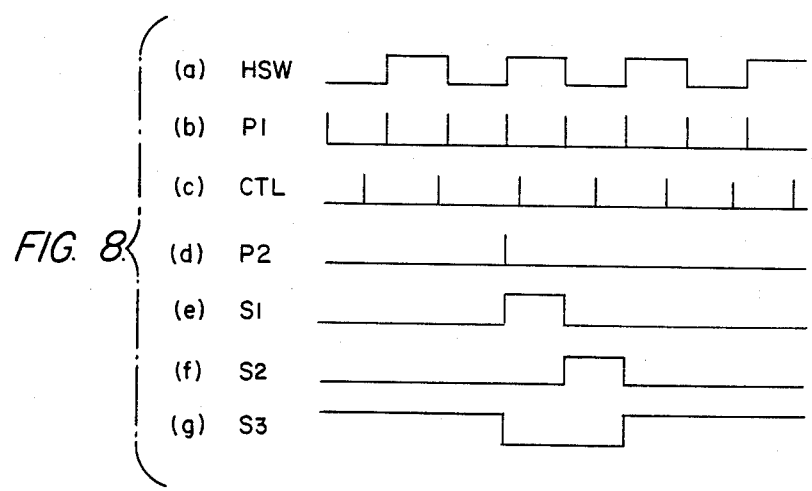
FIG. 8 is a time chart in a fast motion mode.

Now, referring to FIG. 7 and FIG. 8, there is shown a time chart. FIG. 7(a) shows HSW. FIG. 7(b) shows a signal P1 which shows the level insertion (i.e.—the rising or falling edges) of the HSW signal. The signal P1 can easily be derived from the HSW signal by a well-known circuit which is shown as the HSW edge detector 19 in FIG. 6. The signal P1 is supplied to D-FF 13 and AND 16. FIG. 7(c) shows the CTL signal which is supplied to T-FF 12. FIG. 7(d) shows the signal P2 which is the output of the AND gate 16. Here, the signal of the velocity detector shows up at a low level. FIGS. 7(e), (f), and (g) respectively show the signals $S_1$, $S_2$, and $S_3$ which are supplied to the analog switches 9, 10, and 11.

The field in which the CTL signal appears as shown in FIG. 7(c) is the field in which the head shifts track, whereby the signal P2 is generated at the top of the following field as shown in FIG. 7(d). As shown in FIGS. 7(e), (f), and (g), the signal S1 keeps at a low level for 2 fields from signal P2; the signal S2 keeps at a high level at the second field from signal P2; the signal S3 keeps at a high level for 1 field from signal P2; these signals are generated by control circuit 4. Therefore, in the following field from signal P2, the delay circuit chooses the 2H delayed video signal because signal S3 is high, and in the next field the delay circuit chooses the 1H delayed video signal because signal S2 is high, and in the next field, the delay circuit chooses the non-delayed video signal because signal S1 is high. This describes the first above-mentioned correction.

FIG. 8 shows the time chart in the X1 to X2 fast motion mode. In this mode, the output of the velocity detector 2 is at a high level as in FIG. 6, and one pulse CTL usually appears in a field as shown in FIG. 8(c), whereas the H number in a field changes when a CTL pulse does not appear in a field, so the detail of said field has no CTL, and the signal P2 is generated at the top of the field following the one in which the CTL pulse does not appear as in FIG. 8(d). FIGS. 8(e), (f), and (g) respectively show the signals $S_1$, $S_2$, and $S_3$ which are supplied to the analog switches 9, 10, and 11. In the following field from signal P2, the delay circuit 5 chooses the 0H delayed video signal because $S_1$ is high, and in the next field, the delay circuit 5 chooses the 1H delayed video signal because $S_2$ is high and in the next field, the delay circuit 5 chooses the 2H delayed video signal because $S_3$ is high. This describes the above-mentioned second correction.

Then, referring to FIG. 6, the velocity detector 2 which detects the speed of the tape by counting the number of FG pulses in a fixed time, transmits a signal which is either high or low to the track shift detector 3 and control circuit 4. This signal is at a low level when using the first correction, and is at a high level when using the second correction. Therefore, this invention prevents vertical picture fluctuations on a television screen in the abnormal reproducing mode.

Figure 9:
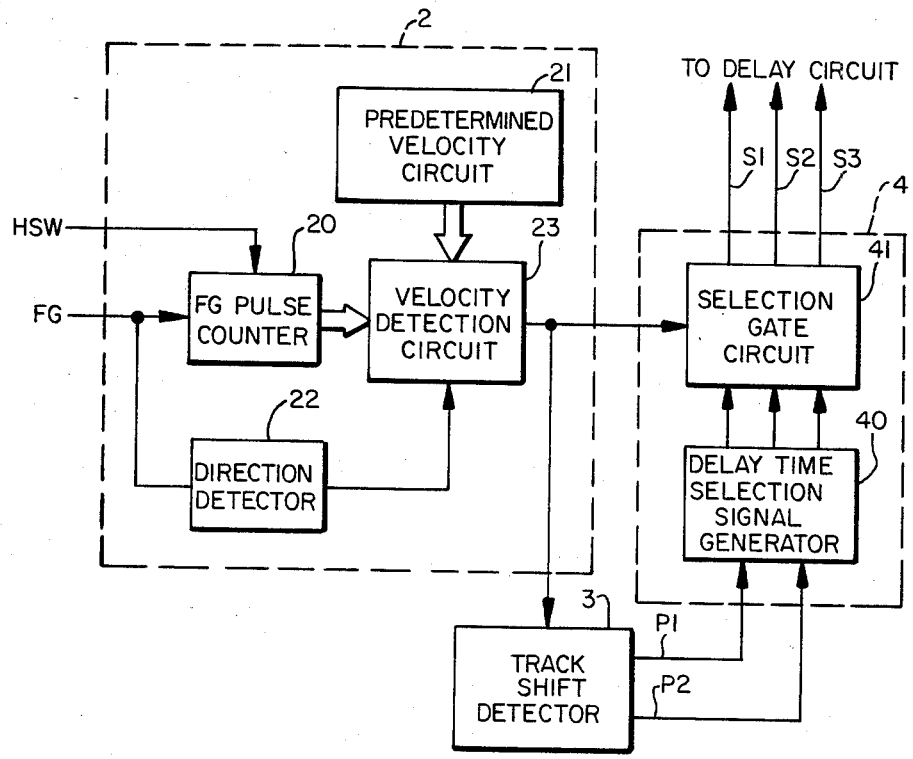
FIG. 9 is a block diagram of an embodiment of the velocity detector and control circuit of FIGS. 5 and 6.

FIG. 9 shows a block diagram of an emobidment of the velocity detector 2 and the control circuit 4. Referring to FIG. 9, element 20 is a FG pulse counter for counting the number of FG pulses in a field; element 21 is a predetermined velocity circuit for setting predetermined speeds corresponding to the reproduction modes of the VTR; element 22 is a direction detector for detecting the direction of the tape movement and for generating a signal for indicating the direction of tape movement; element 23 is a velocity detection circuit for comparing the count stored in the FG pulse counter with the predetermined speeds set in the predetermined speed circuit, and for generating a gating signal which is either high or low in accordance with the comparison result and in accordance with the signal from the direction detector; the abovenoted elements comprise the velocity detector 2. Reference numeral 40 is a delay time selection signal generator for generating, from signals $P_1$ and $P_2$, delay time selection signals which will be used for selectively activating analog switches 9, 10 and 11 via a selection gate circuit 41 for allocating the delay time selection signals ($S_1$, $S_2$, $S_3$) for activating analog switches 9, 10 and 11 in accordance with the gating signal outputted from the velocity detection circuit 23.

Figure 10:
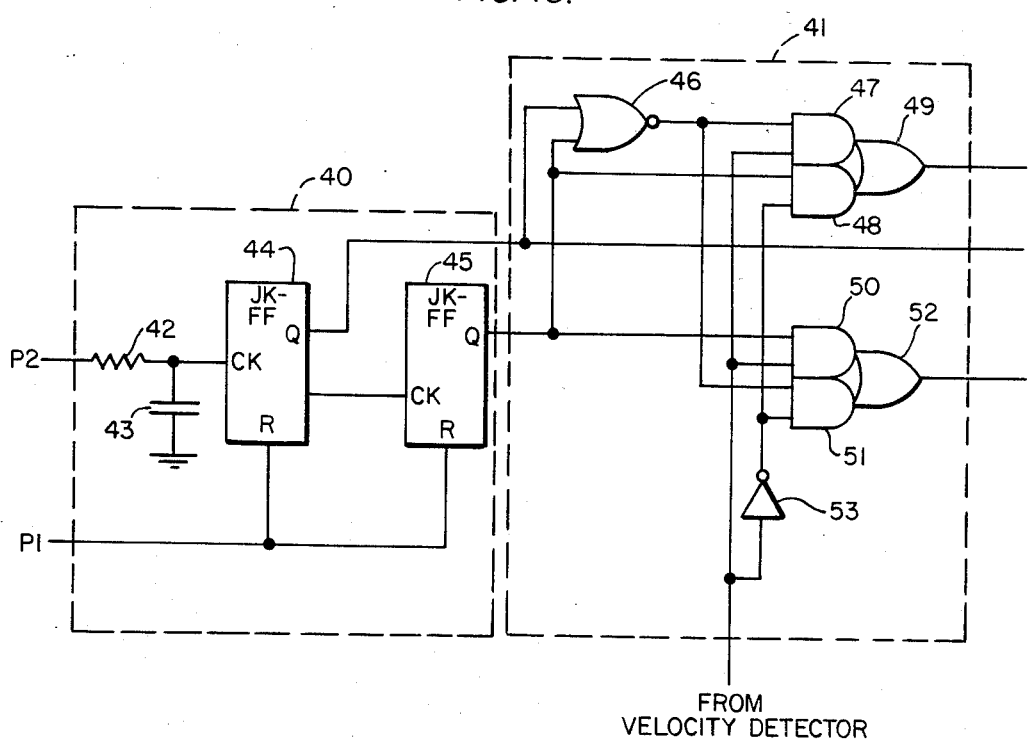
FIG. 10 is a circuit diagram of the control circuit.

FIG. 10 illustrates a circuit diagram of an embodiment of the control circuit. Referring to FIG. 10, element 42 is a resistor and element 43 is a capacitor, these elements forming an integration circuit; elements 44 and 45 are JK flip-flops for generating base signals for producing the delay time selection signals S1, S2 and S3. These flip-flops form the delay time selection signal generator 40. Element 46 is a NOR gate; elements 47 and 48 are AND gates; element 49 is an OR gate; elements 50 and 51 are AND gates; element 52 is an OR gate; element 53 is an inverter; the abovenoted elements form the selection gate circuit 41. The operation of the circuit shown in FIG. 10 is easily understood by one skilled in the art and accordingly, a further description thereof has been omitted for the sake of brevity.

Although, detailed examples of the velocity detector 2 and the control circuit 4 are shown in FIGS. 9 and 10, the function of velocity detector 2 and the control circuit 4 can be easily realized in various ways by a person skilled in the art using hard wired logic, a microcomputer or a combination thereof. Therefore, the embodoments in FIGS. 9 and 10 are merely explanatory examples, and are not for limiting the scope of the invention.

What is claimed is:

1. A system for eliminating vertical TV picture fluctuations appearing in monitored video signals reproduced from a magnetic tape by video tape recorder connected to a TV display, said system comprising:
   a delay circuit connected between said video tape recorder and said TV display for delaying said video signals;
   a velocity detector which is connected to said video tape recorder and which is supplied with both an FG signal for indicating a speed of said magnetic tape and an HSW signal for selecting a magnetic head of said VTR so as to detect said speed of said magnetic tape, both said FG signal and said HSW signal being generated in said VTR;
   a track shift detector which is connected to said video tape recorder and which is supplied with both said HSW signal and a CTL signal which has been previously recorded on said magnetic tape and reproduced by said VTR so as to detect a shift of said magnetic head on a video track which has been recorded on said magnetic tape and has been scanned by said magnetic head; and
   a control circuit connected to said delay circuit and said velocity and track shift detectors for controlling said delay circuit in accordance with both an output signal from said velocity detector and an output signal from said track shift circuit;
   wherein said delay circuit selectively delays said video signal in each video signal field for one of a plurality of predetermined delay times, and wherein said control circuit selects one of said plurality of predetermined delay times in accordance with a delay time of video signals which have occurred in a previous video signal field in which said track shift detector has detected a shift of said magnetic head on said video track, such that the number of horizontal sync signals occurring between adjacent vertical sync signals is kept substantially constant.

2. A system according to claim 1, wherein said control circuit operates in two correction modes: a first correction mode in which said predetermined plurality of delay times are progressively selected in a decreasing direction with respect to their magnitude on a field by field basis so as to maximally delay said video signals; and a second correction mode in which said predetermined plurality of delay times are progressively selected in an increasing direction with respect to their magnitude on a field by field basis so as to minimally delay said video signals, said two correction modes being selected in accordance with said detected speed of said magnetic tape as detected by said velocity detector.

3. A system according to claim 2, wherein said track shift detector counts the number of control pulses included in said CTL signal and occurring during each field and outputs an odd/even signal which indicates whether said counted number of control pulses in each field is even or odd, and wherein said control circuit selectes one of said two correction modes in accordance with said odd/even signal outputted from said track shift detector.

* * * * *